United States Patent
Frambati et al.

(10) Patent No.: US 11,965,999 B2
(45) Date of Patent: Apr. 23, 2024

(54) METHOD AND SYSTEM FOR PROCESSING SEISMIC IMAGES TO OBTAIN SEISMIC HORIZON SURFACES FOR A GEOLOGICAL FORMATION

(71) Applicant: TotalEnergies OneTech, Courbevoie (FR)

(72) Inventors: Stefano Frambati, Pau (FR); Erwann Houzay, Pau (FR); Jean Salles-Loustau, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/246,320

(22) PCT Filed: Sep. 28, 2021

(86) PCT No.: PCT/EP2021/076586
§ 371 (c)(1),
(2) Date: Mar. 22, 2023

(87) PCT Pub. No.: WO2022/069441
PCT Pub. Date: Apr. 7, 2022

(65) Prior Publication Data
US 2023/0305178 A1    Sep. 28, 2023

(30) Foreign Application Priority Data
Sep. 30, 2020    (EP) .................................... 20306131

(51) Int. Cl.
*G01V 1/34* (2006.01)
*G01V 1/28* (2006.01)
*G06T 17/30* (2006.01)

(52) U.S. Cl.
CPC .............. *G01V 1/345* (2013.01); *G01V 1/282* (2013.01); *G06T 17/30* (2013.01)

(58) Field of Classification Search
CPC ......... G01V 1/345; G01V 1/282; G06T 17/30
See application file for complete search history.

(56) References Cited

PUBLICATIONS

Wu, X. and Hale, D., Sep. 2013. Extracting horizons and sequence boundaries from 3D seismic images. In SEG International Exposition and Annual Meeting.*
Non-uniform rational B-spline—Wikipedia.*
(Continued)

*Primary Examiner* — Zhitong Chen
(74) *Attorney, Agent, or Firm* — Seed IP Law Group LLP

(57) ABSTRACT

A computer implemented method for processing a seismic image comprising seismic values obtained from seismic measurements performed on a geological formation includes determining a seismic dip image based on the seismic image, said seismic dip image comprising local seismic dips representative of the local gradient of the seismic values of the seismic image; initializing a seismic horizon surface modeled by using a combination of spline functions or by using a triangle mesh; and iteratively modifying coefficients used for combining the spline functions, thereby iteratively modifying the seismic horizon surface to progressively increase alignment between local orientations of the seismic horizon surface and the corresponding local seismic dips, until a predetermined stop criterion is satisfied.

17 Claims, 5 Drawing Sheets

(56) References Cited

PUBLICATIONS

Levesley, J., 1995. Convolution kernels based on thin-plate splines. Numerical Algorithms, 10, pp. 401-419.*

Fomel, S., 2007. Local seismic attributes. Geophysics, 72(3), pp. A29-A33.*

Gavriil, K., Schiftner, A. and Pottmann, H., 2019. Optimizing B-spline surfaces for developability and paneling architectural freeform surfaces. Computer-Aided Design, 111, pp. 29-43.*

Marsden, M. J., "An Identity for Spline Functions with Applications to Variation-Diminishing Spline Approximation", Journal of Approximation Theory, vol. 3, No. 1, 7-49, Mar. 1970.

Beatson, R. K. et al., "Quasi-Interpolation by Thin-Plate Splines on a Square", Constructive Approximation, vol. 9, No. 4, 407-433, Dec. 1, 1993, 27 pages.

Voglis, C. et al., "BOXCQP: An Algorithm for Bound Constrained Convex Quadratic Problems", Proceedings of the 1st International Conference: From Scientific Computing to Computational Engineering, 1st IC-SCCE, Sep. 8-10, 2004, 9 pages.

Lomask, J. et al., "Flattening without picking", Geophysics, vol. 71, No. 4, p. 13-p. 20, Jul.-Aug. 2006, 9 pages.

Fomel, S., "Local seismic attributes" Geophysics, vol. 72, No. 3, A29-A33, May-Jun. 2007.

Sablonnière, P., "Quasi-Interpolants Splines : Exemples et Applications", ESAIM: Proceedings, vol. 20, 195-207, Oct. 2007.

Wu, X. et al., "Extracting horizons and sequence boundaries from 3D seismic images", CWP-766, Retrieved from the Internet: URL:https://pdfs.semanticscholar.org/4872/8591c2659880101139cac9385c02699b4335.pdf, XP055784585, 223-234, Sep. 1, 2013.

Mounirou, M. et al., "Seismic Horizon and Pseudo-Geological Time Cube Extraction Based on a Riemmanian Geodesic Search", 2016 IEEE 12th Image, Video, and Multidimensional Signal Processing Workshop (IVMSP), 5 pages, Jul. 11, 2016.

International Search Report for International Application No. PCT/EP2021/076586, 3 pages, dated Jan. 10, 2022.

* cited by examiner

METHOD AND SYSTEM FOR PROCESSING SEISMIC IMAGES TO OBTAIN SEISMIC HORIZON SURFACES FOR A GEOLOGICAL FORMATION

BACKGROUND

Technical Field

The present disclosure relates to the processing of seismic images of a geological formation in order to obtain seismic horizon surfaces which correspond to isochronous surfaces of the geological formation. Such seismic horizon surfaces can be used to, e.g., transform a seismic image into a chrono-stratigraphic representation of the geological formation.

Description of the Related Art

It is known, especially in oil exploration, to determine the position of oil reservoirs from the results of geophysical measurements carried out from the surface or in well bores. According to the technology of reflection seismology, these seismic measurements involve emitting a wave (e.g., acoustic waves) into the subsurface and measuring a signal comprising a plurality of echoes of the wave on geological structures being investigated. These structures are typically surfaces separating distinct materials, faults, etc. Other measurements may be carried out at wells bores.

Chrono-stratigraphic analysis (or sequence stratigraphic analysis) is very important to understand basin evolution, predict the sedimentary facies distribution for both petroleum exploration and development. This analysis is based on the fundamental assumption that seismic reflectors are surfaces of chrono-stratigraphic significance. This assumption implies that an individual seismic reflector is a "time-line" through a depositional basin that represents a surface of the same geological age (i.e., an isochronous surface).

A 2D seismic image (or seismic section) is formed by the juxtaposition in a plane of sampled one-dimensional signals referred to as seismic traces. Likewise, a 3D seismic image (or block) is formed by the juxtaposition of seismic traces in a volume. The expression "seismic image" refers either to a seismic cross section (2D) or a seismic block (3D).

In a seismic image, the value of a pixel or voxel is proportional to the seismic amplitude represented by seismic traces.

Computing a chrono-stratigraphic representation of a seismic image often requires determining seismic horizon surfaces of the seismic image. In the present disclosure, a "seismic horizon surface" may be a 1D curve (if the seismic image considered is a 2D seismic image) or a 2D surface (if the seismic image is a 3D seismic image).

[LOMASK2006] describes a method to transform a seismic image to a chrono-stratigraphic image, where the seismic dip is computed at each seismic image point (pixel or voxel), the relative geological time-shift from the seismic image to the geological-time image is determined from an implicit partial differential equation between the seismic dip and the relative geological time-shift. This method relies on a regular grid within the seismic image, usually mapped to the size of the pixels or voxels of the seismic image (i.e., the seismic resolution), required for using fast Fourier transforms enabling to reduce computational complexity. However, due to the regular grid used, it is not possible in this method to introduce prior knowledge on, e.g., where the seismic reflectors are located and/or on where faults are located. For this reason, it is not possible in this method to ensure, e.g., that a determined seismic horizon surface corresponds to an actual seismic reflector. The determined seismic horizon surface is any surface deemed to be isochronous and may as well be a seismic reflector or an isochronous surface located between seismic reflectors. Also, this method will perform poorly in the presence of faults in the geological formation.

BRIEF SUMMARY

The present disclosure aims at improving the situation. In particular, the present disclosure aims at overcoming at least some of the limitations of the prior art discussed above, by proposing a solution for determining seismic horizon surfaces in a computationally efficient manner, while enabling to consider some prior knowledge on the geological formation, if any.

For that purpose, the proposed solution introduces new strategies for modeling the seismic horizon surfaces, that may be described by a less denser grid than in the prior art, thereby reducing computational complexity for determining the seismic horizon surfaces, and also enabling taking into account prior knowledge on the geological formation, if any. The proposed strategies include modeling the seismic horizon surfaces using a combination of spline functions or using a triangle mesh.

According to a first aspect, the present disclosure relates to a computer-implemented method for processing a seismic image comprising seismic values obtained from seismic measurements performed on a geological formation, wherein said method comprises:
  determining a seismic dip image based on the seismic image, said seismic dip image comprising local seismic dips representative of the local gradient of the seismic values of the seismic image;
  initializing a seismic horizon surface modeled using a combination of spline functions; and
  iteratively modifying coefficients used for combining the spline functions, thereby iteratively modifying the seismic horizon surface, to progressively increase alignment between local orientations of the seismic horizon surface and the corresponding local seismic dips, until a predetermined stop criterion is satisfied.

Hence, the proposed processing method iteratively modifies a seismic horizon surface in order to progressively align the local orientations of the surface with the local seismic dips computed based on the seismic image. For that purpose, the seismic horizon surface is modeled using spline functions, which makes it possible to describe complex surfaces with a reduced number of points (knots), thereby decreasing the required computational complexity.

In specific embodiments, the processing method can further comprise one or more of the following features, considered either alone or in any technically possible combination.

In specific embodiments, the spline functions are basis-splines (B-splines) or non-uniform rational B-splines (NURBS). Other spline functions may also be considered in other embodiments, such as, e.g., box splines, simplex splines, polyhedral splines, cone splines, etc.

In specific embodiments, the spline functions are defined by a set of knots comprising a number of knots that is lower than a number of seismic values in a horizontal plane of the seismic image, preferably by a factor at least 10 or at least 100.

In specific embodiments, the spline functions are of degree 2 or 3.

In specific embodiments, the processing method comprises:
  obtaining a set of setpoints of the seismic image; and
  constraining the seismic horizon surface to approximate the set of setpoints when modifying the seismic horizon surface to iteratively increase alignment between local orientations of the seismic horizon surface and the corresponding local seismic dips.

In specific embodiments, the processing method comprises approximating the set of setpoints using a spline quasi-interpolant operator.

Indeed, while spline functions are an efficient tool to describe complex surfaces, they are difficult to use as such when it is required that the surface intersects specific (set) points. Spline quasi-interpolant operators [SABLON2007] may be used to closely approximate target functions by using spline functions. Hence, the coefficients of those spline functions which are defined in the area of the set of setpoints are determined using a spline quasi-interpolant operator, such that the combination of the spline functions in said area can locally closely approximate the target function defined by the set of setpoints.

In specific embodiments, approximating the set of setpoints using a spline quasi-interpolant operator comprises selecting a subset of spline functions among the spline functions used for modeling the seismic horizon surface, wherein the spline quasi-interpolant operator is used to determine the coefficients associated to the subset of spline functions. For instance, said selection is carried out by comparing the positions of the setpoints with the positions of a set of knots of the spline functions and/or by comparing the positions of the setpoints with the positions of peak values of the spline functions.

In specific embodiments, constraining the seismic horizon surface to approximate the set of setpoints uses an active set technique.

In specific embodiments, the spline quasi-interpolant operator is an integral spline quasi-interpolant operator.

In specific embodiments, obtaining the set of setpoints comprises obtaining a seed on a seismic trace of the seismic image and propagating laterally the seed by searching for points of adjacent seismic traces that satisfy a predetermined criterion of similarity with the seed. For instance, the seed may be determined based on measurements performed at a well bore in the geological formation and/or may correspond to a point positioned manually a human interpreter.

According to a second aspect, the present disclosure relates to a computer-implemented method for processing a seismic image comprising seismic values obtained from seismic measurements performed on a geological formation, wherein said method comprises:
  determining a seismic dip image based on the seismic image, said seismic dip image comprising local seismic dips representative of the local gradient of the seismic values of the seismic image;
  initializing a seismic horizon surface modeled by a triangle mesh; and
  iteratively modifying the coordinates of the corners of the triangles composing the triangle mesh, thereby iteratively modifying the seismic horizon surface, to progressively increase alignment between local orientations of the seismic horizon surface and the corresponding local seismic dips, until a predetermined stop criterion is satisfied.

As for using spline functions, using a triangle mesh enables to model complex surfaces with a reduced number of points (corners of triangles), thereby decreasing the required computational complexity.

In specific embodiments, the processing method can further comprise one or more of the following features, considered either alone or in any technically possible combination.

In specific embodiments, the triangle mesh comprises a number of corners that is lower than a number of seismic values in a horizontal plane of the seismic image, preferably by a factor at least 10 or at least 100.

In specific embodiments, the method comprises increasing a local density of corners of the triangle mesh in a portion of the seismic horizon surface where a predetermined criterion of detection of a strong local curvature is satisfied.

In specific embodiments, the method comprises decreasing a local density of corners of the triangle mesh in a portion of the seismic horizon surface where a predetermined criterion of detection of a small local curvature is satisfied.

In specific embodiments, the triangle mesh is irregular.

In specific embodiments, the method comprises:
  obtaining a set of setpoints of the seismic image; and
  constraining the seismic horizon surface to approximate the set of setpoints when modifying the seismic horizon surface to iteratively increase alignment between local orientations of the seismic horizon surface and the corresponding local seismic dips.

In specific embodiments, constraining the seismic horizon surface to approximate the set of setpoints uses an active set technique.

In specific embodiments, obtaining the set of setpoints comprises obtaining a seed on a seismic trace of the seismic image and propagating laterally the seed by searching for points of adjacent seismic traces that satisfy a predetermined criterion of similarity with the seed. For instance, the seed may be determined based on measurements performed at a well bore in the geological formation and/or may correspond to a point positioned manually a human interpreter.

According to a third aspect, the present disclosure relates to a computer program product comprising instructions which, when executed by at least one processor, configure said at least one processor to carry out a processing method according to any one of the embodiments of the present disclosure.

According to a fourth aspect, the present disclosure relates to a computer-readable storage medium comprising instructions which, when executed by at least one processor, configure said at least one processor to carry out a processing method according to any one of the embodiments of the present disclosure.

According to a fifth aspect, the present disclosure relates to a computer system for processing a seismic image, said computer system comprising at least one processor configured to carry out a processing method according to any one of the embodiments of the present disclosure.

BRIEF DESCRIPTION OF THE SEVERAL VIEWS OF THE DRAWINGS

The disclosure will be better understood upon reading the following description, given as an example that is in no way limiting, and made in reference to the figures which show.

In these figures, identical references from one figure to another designate identical or analogous elements. For reasons of clarity, the elements shown are not to scale, unless explicitly stated otherwise.

DETAILED DESCRIPTION

As discussed above, the present disclosure relates inter alia to a method 30 (FIG. 2) for processing seismic images.

A seismic image represents a picture of the subsoil arising from a seismic exploration survey. The seismic image comprises at least two dimensions which may comprise at least one horizontal dimension (which usually uses a distance scale, expressed, e.g., in meters) and one vertical dimension (which usually uses a distance scale or a time scale, expressed, e.g., in seconds). Hence, the seismic image may correspond to a 3D seismic image (with two horizontal dimensions and one vertical dimension) or to a 2D seismic image (with one horizontal dimension and one vertical dimension).

The seismic image is composed of pixels which may be 2D in case of a 2D seismic image or 3D (voxels) in case of a 3D seismic image. The pixels are regularly distributed according to a horizontal pitch on each horizontal dimension and a vertical pitch on the vertical dimension. The seismic image comprises, along each horizontal dimension:
- a number of columns of pixels which is equal to the quotient of the horizontal extension along this horizontal dimension divided by the horizontal pitch along this horizontal dimension; each column of the seismic image may be referred to as "seismic trace"; and
- a number of pixels per column which is equal to the quotient of the vertical extension divided by the vertical pitch.

Each pixel is associated with a seismic value which may be a gray value, for instance between 0 and 255 (or 65535). Each seismic value is representative of the amplitude of the seismic signal measured for the position associated to the corresponding pixel.

Figure 1:
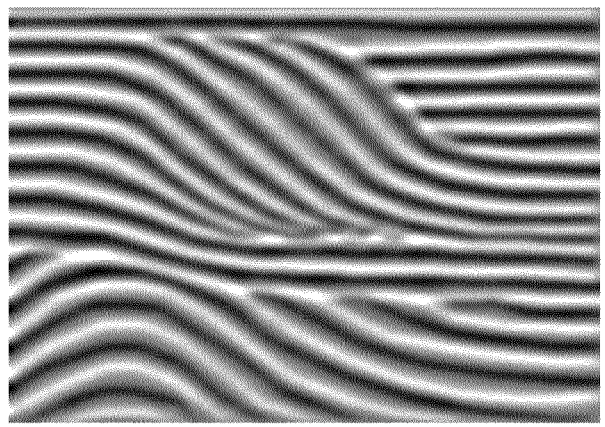
FIG. 1 is an example of seismic image.

FIG. 1 represents an example of seismic image. The seismic image represented by FIG. 1 is 2D and may correspond to a 2D seismic image or to a 2D section of a 3D seismic image, in a vertical plane comprising one of its horizontal dimensions. As can be seen in FIG. 1, the seismic values highlight the composition of the geological formation, since high amplitude seismic values are usually associated to strong seismic reflectors, which are usually located at the interfaces between geological layers having different acoustic impedances.

Figure 2:
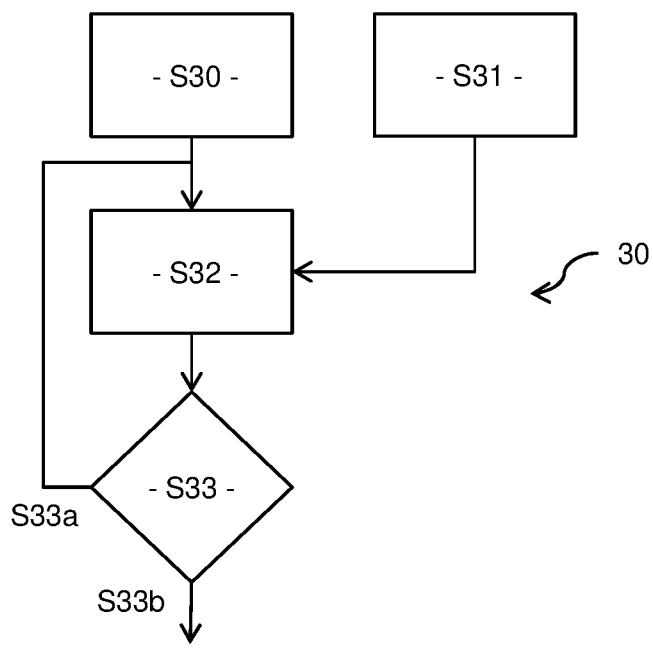
FIG. 2 is a flow chart illustrating the main steps of a method for processing a seismic image.

FIG. 2 represents schematically the main steps of an exemplary embodiment of a computer-implemented processing method 30 for processing a seismic image.

The processing method 30 is carried out by a computer system (not represented in the figures). In preferred embodiments, the computer system comprises one or more processors (which may belong to a same computer or to different computers) and storage means (magnetic hard disk, optical disk, electronic memory, or any computer readable storage medium) in which a computer program product is stored, in the form of a set of program-code instructions to be executed in order to implement all or part of the steps of the processing method 30. Alternatively, or in combination thereof, the computer system can comprise one or more programmable logic circuits (FPGA, PLD, etc.), and/or one or more specialized integrated circuits (ASIC), etc., adapted for implementing all or part of said steps of the processing method 30. In other words, the computer system comprises a set of means configured by software (specific computer program product) and/or by hardware (processor, FPGA, PLD, ASIC, etc.) to implement the steps of the processing method 30.

As illustrated by FIG. 2, the processing method 30 comprises a step S30 of determining a seismic dip image based on the seismic image.

Figure 3:
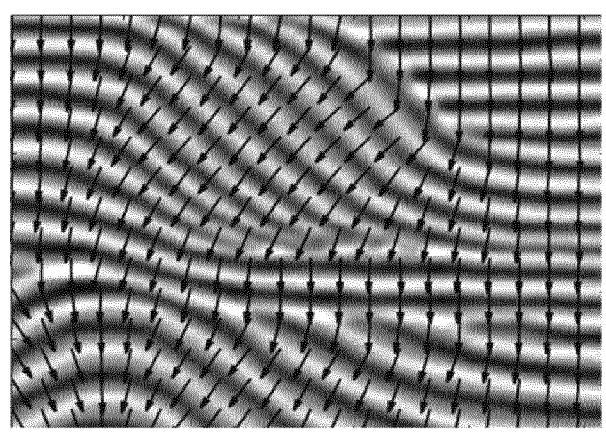
FIG. 3 is a schematic representation of the local seismic dips of the seismic image of FIG. 1.

As the seismic image, the seismic dip image is composed of pixels, and each pixel of the seismic dip image is associated with a local seismic dip which represents the local gradient of the seismic values of the seismic image. Hence, each local seismic dip corresponds to a vector comprising all or part of the partial derivatives of the seismic values of the seismic image. By "local" seismic dip, we mean that the seismic dip computed is for a given pixel or a patch of adjacent pixels. FIG. 3 represents schematically, superimposed on the seismic image, the local seismic dips computed for the seismic image of FIG. 1 for different positions within the seismic image.

The processing method 30 comprises also a step S31 of initializing one or several seismic horizon surfaces. For instance, each seismic horizon surface may be initialized as a horizontal surface having a predetermined vertical position in the vertical dimension of the seismic image. The initialization of a seismic horizon surface depends on how the seismic horizon surface is modeled, which will be discussed hereinafter. In the sequel, for a given point of the seismic horizon surface, we refer by "local orientation" of the seismic horizon surface the direction defined by the axis that intersects the seismic horizon surface at said given point and that is (locally) orthogonal to said seismic horizon surface.

Then, and as can be seen in FIG. 2, the processing method 30 comprises, for each initialized seismic horizon surface, a step S32 of modifying the seismic horizon surface. During step S32, each seismic horizon surface is modified in order to increase alignment between local orientations of the seismic horizon surface and the corresponding local seismic dips. A local orientation of the seismic horizon surface and the corresponding local seismic dip are considered "aligned" when they are parallel.

The processing method 30 comprises also a step S33 of evaluating a predetermined stop criterion. If the stop criterion is not satisfied (reference S33a in FIG. 2), then the step S32 of modifying the seismic horizon surface is executed again, to further increase alignment between local orientations of the seismic horizon surface and the corresponding local seismic dips. If the stop criterion is satisfied (reference S33b in FIG. 2), then the processing method 30 may stop for the considered seismic horizon surface. In other words, each seismic horizon surface is iteratively modified to progressively increase alignment between local orientations of the seismic horizon surface and the corresponding local seismic dips, until the stop criterion is satisfied for said seismic horizon surface.

When the stop criterion is satisfied, each local orientation of the seismic horizon surface should be in principle substantially parallel with the corresponding local seismic dip. In other words, when the stop criterion is satisfied, the seismic horizon surface should be in principle substantially locally orthogonal to each local seismic dip.

Figure 4:
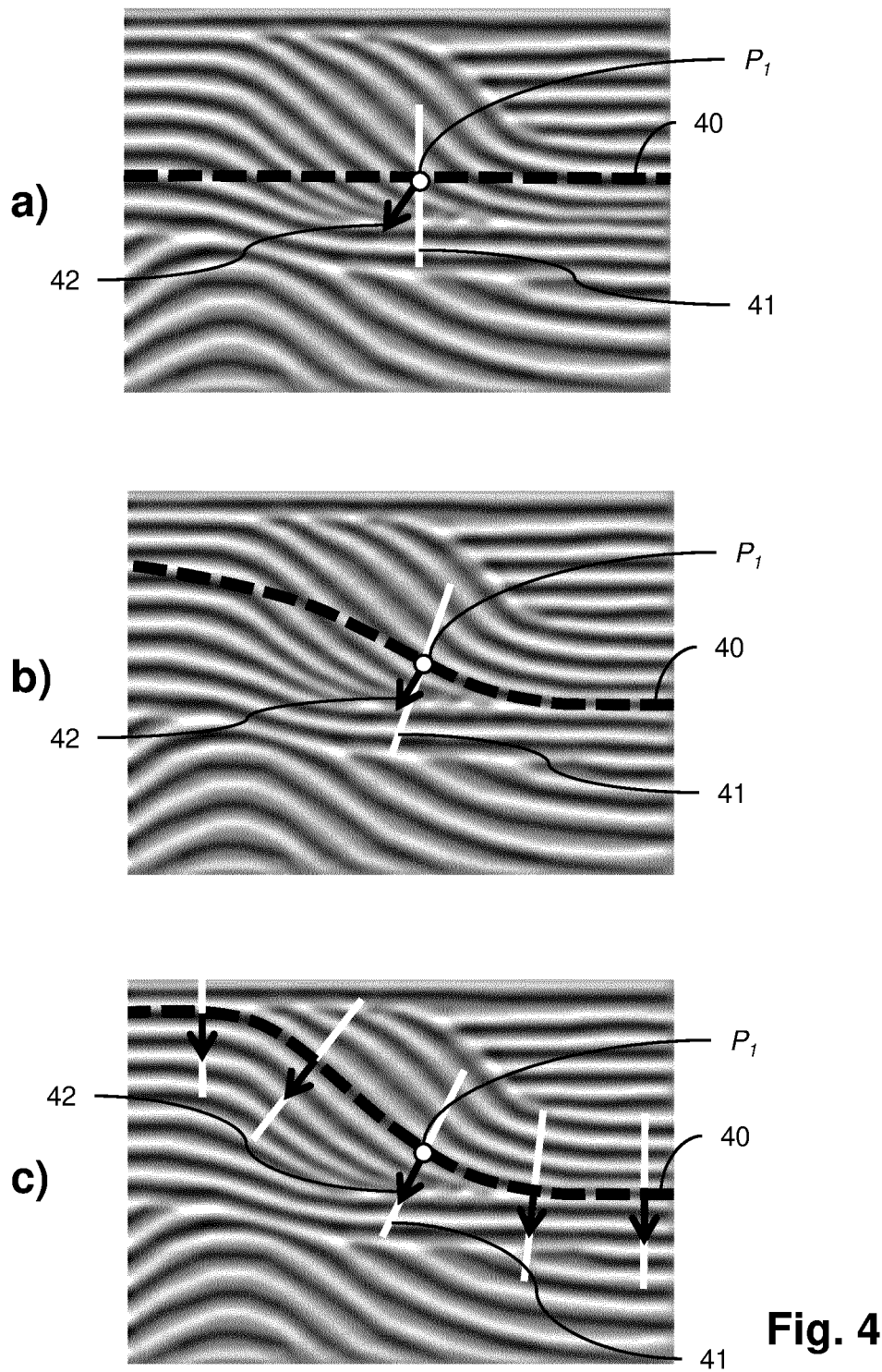
FIG. 4 provides charts according to parts a) to c) illustrating the evolution of a seismic horizon surface when using the processing method of FIG. 2.

FIG. 4 represents schematically the evolution of a seismic horizon surface during successive iterations of step S32.

As can be seen in part a) of FIG. 4, a seismic horizon surface 40 (represented as a black dashed line) is initially substantially horizontal. Part a) of FIG. 4 represents also the local orientation 41 (represented as a white line) at a point $P_1$ of the seismic horizon surface 40. Since the seismic horizon surface 40 is substantially horizontal, the local orientation 41 is substantially vertical. Part a) of FIG. 4 represents also the local seismic dip 42 (represented as a black arrow) computed at point $P_1$, which is slanted.

Part b) of FIG. 4 represents the seismic horizon surface 40 obtained after one or more iterations of step S32 from the seismic horizon surface 40 of part a) of FIG. 4. As can be seen in part b) of FIG. 4, the seismic horizon surface 40 has been modified in order to increase alignment between local orientations of the seismic horizon surface and local seismic dips, including between the local orientation 41 and the local seismic dip 42 computed at point $P_1$ of the seismic horizon surface 40.

Part c) of FIG. 4 represents the seismic horizon surface 40 obtained after one or more iterations of step S32 from the seismic horizon surface 40 of part b) of FIG. 4. As can be seen in part c) of FIG. 4, the obtained seismic horizon surface 40 is such that local orientations and local seismic dips are substantially aligned at each point of the seismic horizon surface, including at point $P_1$. At this stage, the stop criterion may be considered satisfied and the iterations of step S32 may stop.

One possible method for determining one or more seismic horizon surfaces is known from [LOMASK2006]. Basically, the method proposed in [LOMASK2006] aims at finding a seismic horizon surface $\tau(x, y)$ (x and y being the horizontal dimensions). An Euler-Lagrange equation is used to find the seismic horizon surface $\tau(x, y)$ that minimizes an energy function $J(\tau)$:

$$J(\tau)=\iint F(x,y,\tau,\tau_x,\tau_y)dxdy \quad (E1)$$

expression in which $\tau_x$ and $\tau_y$ are the partial derivatives of $\tau$ in the x and y dimensions, i.e., respectively $\partial\tau/\partial x$ and $\partial\tau/\partial y$. According to a non-limitative example, the function F may be given by:

$$F = \left(b(x, y, \tau) - \frac{\partial \tau}{\partial x}\right)^2 + \left(q(x, y, \tau) - \frac{\partial \tau}{\partial y}\right)^2 \quad (E2)$$

expression in which b is the local seismic dip in the x dimension and q is the local seismic dip in the y dimension.

The Euler-Lagrange equation can be expressed as:

$$\frac{\partial F}{\partial \tau} - \frac{d}{dx}\left[\frac{\partial F}{\partial \tau_x}\right] - \frac{d}{dy}\left[\frac{\partial F}{\partial \tau_y}\right] = 0 \quad (E3)$$

By calculating $\partial F/\partial\tau$, $\partial F/\partial\tau_x$ and $\partial F/\partial\tau_y$, we get:

$$\frac{\partial F}{\partial \tau} = 2\left(b - \frac{\partial \tau}{\partial x}\right)\frac{\partial b}{\partial \tau} + 2\left(q - \frac{\partial \tau}{\partial y}\right)\frac{\partial q}{\partial \tau}$$

$$\frac{\partial F}{\partial \tau_x} = -2\left(b - \frac{\partial \tau}{\partial x}\right)$$

$$\frac{\partial F}{\partial \tau_y} = -2\left(q - \frac{\partial \tau}{\partial y}\right)$$

By substituting into the Euler-Lagrange equation (E3), we get:

$$\underbrace{\frac{\partial^2 \tau}{\partial x^2} + \frac{\partial^2 \tau}{\partial y^2}}_{\substack{=\nabla^T \nabla \tau \\ =\Delta\tau}} = \underbrace{\frac{\partial b}{\partial x} + \frac{\partial q}{\partial y}}_{\substack{=\nabla^T G \\ =div(G)}} + \frac{1}{2}\frac{\partial(b^2 + q^2)}{\partial \tau} \quad (E4)$$

expression in which:

$G = [b \ q]^T$ is the local seismic dip;

$\nabla = \left[\frac{\partial}{\partial x} \ \frac{\partial}{\partial y}\right]^T$ is the gradient operator;

$\Delta$ is the Laplace operator; and div is the divergence operator.

The last term of the expression (E4) may be ignored in order to enable more efficient implementations. In [LOMASK2006], the last term is ignored in order to be able to solve the equation in the Fourier domain, by considering a regular and dense grid within the seismic dip image.

Hence, the equation to be solved may considered to be:

$$\Delta\tau(x,y)=\text{div}[G(x,y,t+\tau(x,y))] \quad (E5)$$

expression in which t corresponds to the vertical dimension.

The equation (E5) is non-linear and may be solved by using, e.g., a non-linear Gauss-Newton algorithm, by iterating the following steps (k being the iteration index):

computing a residual:

$$r^{(k)}(x,y)=\nabla\tau^{(k)}(x,y)-G(x,y,t+\tau^{(k)}(x,y)) \quad (E6)$$

computing an updating term:

$$\Delta\delta\tau^{(k)}(x,y)=-\text{div}(r^{(k)}(x,y)) \quad (E7)$$

updating $\tau$:

$$\tau^{(k+1)}(x,y)=\tau^{(k)}(x,y)+\delta\tau^{(k)}(x,y) \quad (E8)$$

These steps may be iterated until the stop criterion is satisfied. In practice, any suitable stop criterion may be used, and the choice of a specific stop criterion corresponds to a specific embodiment of the present disclosure. For instance, the stop criterion may be considered satisfied when:

$$\frac{\left\|r^{(k-1)}\right\| - \left\|r^{(k)}\right\|}{\left\|r^{(0)}\right\|} < \mu \quad (E9)$$

wherein μ is a predetermined positive threshold, for instance equal to 0.001. The stop criterion as defined by equation (E9) is advantageous in that it is robust to noise. In particular, it is less noise sensitive than, e.g., considering instead just the residual norm $\|r^{(k)}\|$ (i.e., considering that the stop criterion is satisfied when the residual norm $\|r^{(k)}\|$ is less than a predetermined positive threshold).

Alternatively, or in combination, the stop criterion may be considered satisfied when the number of iterations reaches a predetermined maximum number of iterations, when the residual norm $\|r^{(k)}\|$ is less than a predetermined positive threshold, etc.

Figure 5:
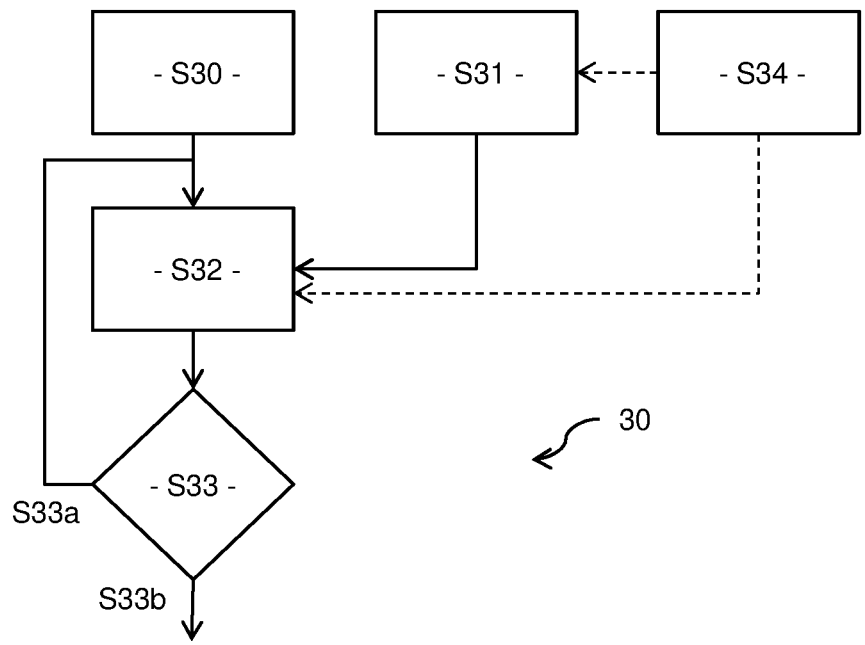
FIG. 5 is a flow chart illustrating the main steps of a processing method according to a preferred embodiment.

FIG. 5 represents schematically the main steps of a preferred embodiment of the processing method 30.

As can be seen in FIG. 5, the processing method 30 comprises, in addition to the steps discussed in reference to FIG. 2, a step S34 of obtaining a set of setpoints of the seismic image. The set of setpoints, which comprises at least one setpoint, corresponds to constraints that need to be considered when iteratively modifying the seismic horizon surface. In other words, the seismic horizon surface is constrained to approximate the set of setpoints from one iteration to another. Hence, in the portion of the seismic horizon surface that needs to approximate the set of setpoints, approximating the set of setpoints takes precedence over locally aligning the local orientations of the portion of the seismic horizon surface with the local seismic dips.

The set of setpoints may for instance be derived from measurements performed at a well bore in the geological formation and/or from points positioned manually in the seismic image by human interpreters. For instance, obtaining the set of setpoints may comprise obtaining a seed on a seismic trace (column of the seismic image) and processing the seismic image (by the computer system) to propagate laterally the seed by searching for points of adjacent seismic traces that satisfy a predetermined criterion of similarity with the seed. For instance, the lateral search may be performed by correlating an adjacent seismic trace with vertically translated copies of the seismic trace comprising the seed in order to identify the vertical translation that optimizes the similarity (e.g., maximum correlation value and/or correlation value above a predetermined threshold) with the seismic trace comprising the seed.

Of course, different sets of setpoints may be provided for different seismic horizon surfaces. Also, some seismic horizon surfaces may be provided with respective sets of setpoints while other seismic horizon surfaces may not be constrained by any set of setpoints. The set of setpoints may be used also, in preferred embodiments, in step S31 of initializing the seismic horizon surface.

As discussed above, the seismic horizon surfaces considered in the present disclosure are modeled using either a triangle mesh or spline functions. We provide below non-limitative examples illustrating how the processing method 30 may be implemented with a triangle mesh or with spline functions. Both these representations enable modeling complex surfaces with a reduced complexity. These representations enable also to apply constraints onto the seismic horizon surfaces in order to consider, e.g., a prior knowledge on the seismic reflectors (measurements performed at a well bore in the geological formation, setpoints positioned manually by a human interpreter, etc.), which was not possible with the solution proposed in [LOMASK2006].

Triangle Mesh

According to a first strategy, the seismic horizon surface(s) may be modeled by using a triangle mesh.

In that case, initializing a seismic horizon surface (step S31) may resume to initializing the positions (coordinates) of a predetermined number of corners of the triangles composing the triangle mesh. Preferably, the triangle mesh is, at least initially, regular in that the projections of the triangles onto a horizontal plane have all identical shapes and dimensions.

The seismic horizon surface is then iteratively modified (step S32) by iteratively modifying the coordinates of the corners of the triangles composing the triangle mesh. Preferably, only the vertical coordinates of the corners are iteratively modified to progressively increase alignment between local orientations and the corresponding local seismic dips.

Figure 6:
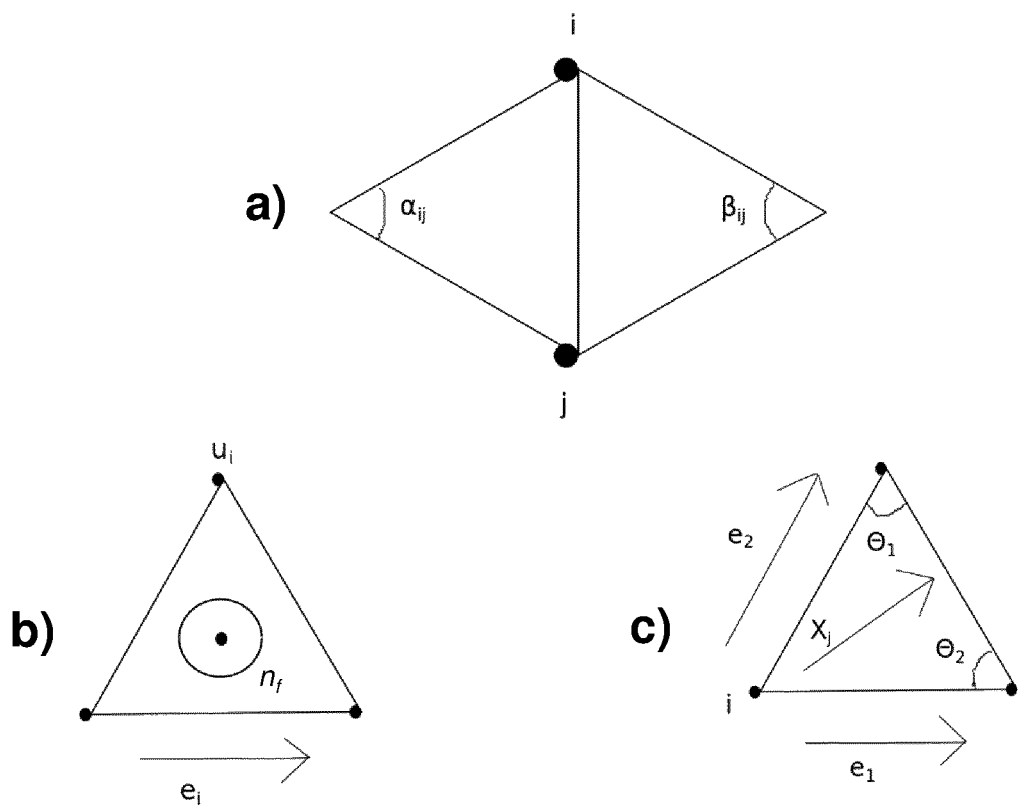
FIG. 6 provides charts according to parts a) to c) illustrating notations and conventions used when modeling a seismic horizon surface with a triangle mesh.

When considering a triangle mesh, the Laplace operator $\Delta$ may be expressed as follows at the corner of index i (see part a) of FIG. 6):

$$(\Delta u) = \underbrace{\frac{1}{2A_i}}_{M^{-1}} \underbrace{\sum_j (\cot(\alpha_{ij}) + \cot(\beta_{ij}))(u_j - u_i)}_{L_c u} \quad \text{(E10)}$$

expression in which (see part a) of FIG. 6):
  $u \in \mathbb{R}^{|S|}$ is a piecewise linear function on a triangle having corners in S; in the present case, u will correspond to $\tau^{(k)}$.
  $A_i$ is a third (⅓) of the area (e.g., in m²) of all triangles having the corner of index i;
  the corners of index j are the neighbors of the corner of index i; and
  $\alpha_{ij}$ and $\beta_{ij}$ are angles opposed to the edge joining the corners of indexes i and j.
  From equation (E10), we get:

$$\Delta = M^{-1} L_c \quad \text{(E11)}$$

expression in which $M \in \mathbb{R}^{|S| \times |S|}$ is a diagonal matrix and $L_c \in \mathbb{R}^{|S| \times |S|}$.

When considering a triangle mesh, the gradient operator $\nabla$ may be expressed as follows at a triangle of index $f$ (see part b) of FIG. 6):

$$\nabla u = \frac{1}{2A_f} \sum_i u_i (n_f \wedge e_i) \quad \text{(E12)}$$

expression in which (see part b) of FIG. 6):
  $A_f$ is the area (e.g., in m²) of the considered triangle of index $f$;
  $n_f$ is the outward unit normal of the considered triangle of index $f$;
  $e_i$ is the edge vector of index i of the considered triangle of index $f$ (with a counterclockwise orientation); and
  $u_i$ is the value of u at the corner of the considered triangle of index $f$ opposed to the edge of index i.

When considering a triangle mesh, the divergence operator div may be expressed as follows for a vector X at a corner of index i (see part c) of FIG. 6):

$$\nabla \cdot X = \text{div}(X) = \tfrac{1}{2} \Sigma_j (\cot \theta_1 (e_1 \cdot X_j) + \cot \theta_2 (e_2 \cdot X_j)) \quad \text{(E13)}$$

expression in which (see part c) of FIG. 6):
  the sum over the index j corresponds to the sum over all the triangles having the corner of index i;
  $X_j$ corresponds to the vector towards the edge opposed to the corner of index i in the triangle of index j;
  $e_1$ and $e_2$ are the vectors from the corner of index i to the other corners of the triangle of index j; and $\theta_1$ and $\theta_2$ are the angles of the triangle of index j that are opposed to the corner of index i.

Accordingly, the equations (E6), (E7) and (E8) of the non-linear Gauss-Newton algorithm may be expressed respectively as:

computing a residual for a triangle of index $f$:

$$r_f^{(k)} = \frac{1}{2A_f} \sum_i \tau_i^{(k)} (n_f \wedge e_i) - G_f(x, y, t + \tau_i^{(k)}(x, y)) \quad (E14)$$

wherein $G_f$ is the mean of the local seismic dip on the triangle of index $f$;

computing an updating term for a corner of index s:

$$\underbrace{M^{-1} L_c \delta \tau_s^{(k)}}_{\underbrace{A}_{X}} = \underbrace{-\frac{1}{2} \sum_j \left( \cot \theta_1 (e_1 \cdot r_j^{(k)}) + \cot \theta_2 (e_2 \cdot r_j^{(k)}) \right)}_{B} \quad (E15)$$

updating $\tau$:

$$\tau^{(k+1)} = \tau^{(k)} + \delta \tau^{(k)}$$

The equation (E15) provides the linear system AX=B that needs to be solved in order to get $X=\delta \tau^{(k)} = A^{-1} B$. For instance, $A^{-1}$ can be computed by using the decomposition of Cholesky. Indeed, the matrix A is symmetric and positive-definite, such that:

$$A = \underset{\substack{\text{lower} \\ \text{triangular} \\ \text{matrix}}}{L} L^T \Rightarrow A^{-1} = (L^{-1})^T (L^{-1})$$

Hence, by using the above equations, the seismic horizon surface may be modeled by a triangle mesh and iteratively modified to progressively increase alignment between local orientations and local seismic dips.

Preferably, the number of corners of the triangle mesh is lower than a number of pixels (seismic values) in a horizontal plane of the seismic image. For instance, if we denote by $N_{ph}$ the number of pixels in a horizontal plane (defined by the horizontal extension(s) and the horizontal pitch(es)), then the number of corners of the triangle mesh of the seismic horizon surface is preferably lower than $N_{ph}/10$ or even lower than $N_{ph}/100$.

As indicated above, the triangle mesh is preferably regular. However, it is possible, in some embodiments, to modify the triangle mesh by locally increasing or decreasing the density of corners. For instance, if it is detected that the number of corners is locally not sufficient to correctly align the local orientation with the local seismic dip, then the number of corners may be locally increased to locally reduce the dimensions of the triangles projected onto a horizontal plane, resulting in an irregular triangle mesh, locally refined. Similarly, if it is detected that the seismic horizon surface obtained is locally substantially flat while the local orientations are substantially aligned with the corresponding local seismic dips, then the number of corners may be locally decreased to locally increase the dimensions of the triangles projected onto a horizontal plane, resulting in an irregular triangle mesh, locally coarse. Hence, the density of corners may be locally adjusted in order to adapt to the local variations of the local seismic dip.

In other words, it is possible to increase a local density of corners of the triangle mesh in a portion of the seismic horizon surface where a predetermined criterion of detection of a strong local curvature is satisfied, or to decrease a local density of corners of the triangle mesh in a portion of the seismic horizon surface where a predetermined criterion of detection of a small local curvature is satisfied. For instance, the criterion of strong (resp. small) local curvature may be considered satisfied when the local variations of the seismic horizon surface from one iteration to another remain above (resp. below) a predetermined threshold after several iterations and/or if the local difference between the local orientation and the local seismic dip remains above (resp. below) a predetermined threshold after several iterations, etc.

As discussed above in reference to FIG. 5, the seismic horizon surface may be constrained by a set of setpoints when progressively increasing alignment between the local orientations and the corresponding local seismic dips. For instance, this may be accomplished, when considering a seismic horizon surface modeled by a triangle mesh, by decomposing the matrices A, X and B into constrained parts and unconstrained parts, as follows:

$$\underbrace{\begin{pmatrix} A_{ff} & A_{fc} \\ A_{cf} & A_{cc} \end{pmatrix}}_{A} \underbrace{\begin{pmatrix} X_f \\ X_c \end{pmatrix}}_{X} = \underbrace{\begin{pmatrix} B_f \\ B_c \end{pmatrix}}_{B} \quad (E16)$$

expression in which $X_c$ corresponds to the values of X that are constrained by the set of setpoints. More specifically, $X_c$ is equal to $X_c = (\tau_c - \overline{\tau_c})$ wherein $\tau_c$ corresponds to a vector containing the current values of the seismic horizon surface in the portion constrained by the setpoints, and $\overline{\tau_c}$ corresponds to a vector containing the values of the setpoints. $X_f$ corresponds to the values of X that can be freely modified from one iteration to another. $B_f = A_{ff} X_f + A_{fc} X_c$ and $B_c = A_{cf} X_f + A_{cc} X_c$, wherein $A_{cf} = A_{fc}$ since A is a symmetric matrix. Hence, we get:

$$X_f = A_{ff}^{-1} (B_f - A_{fc} X_c) \quad (E17)$$

It should be noted that it is precisely the inversion of matrix $A_{ff}$ that makes it impossible to use the fast Fourier transforms proposed in [LOMASK2006]. In the present case, the computational complexity of computing $A_{ff}^{-1}$ may however be reduced by reducing the number of variables, i.e., by considering a number of corners that is lower or substantially lower than the number of points in a horizontal plane of the seismic image. If several seismic horizon surfaces to be computed are constrained by a same set of setpoints, then the inversion of matrix $A_{ff}$ may be performed only once for all these seismic horizon surfaces, in order to further reduce computational complexity.

It should also be noted that $X_c$ can also be used in order to initialize the seismic horizon surface, during step S31.

It should be noted that it is also possible to consider a set of setpoints that defines inequalities that need to be locally satisfied by the seismic horizon surface. In other words, each setpoint may be defined as a continuous interval of allowed positions (i.e., maximum and minimum values along the vertical dimension) for the corresponding point of the seismic horizon surface (i.e., the point having the same coordinates in the horizontal dimension(s) as the considered setpoint). Considering a set of constraints defining inequalities is useful, e.g., in the presence of faults in the geological formation. For instance, a simple implementation may consist in ensuring that the inequalities are satisfied when initializing the seismic horizon surface, and when modifying the seismic horizon surface during step S32. Alternatively, constraining the seismic horizon surface to approximate setpoints defined by inequalities may use an active set technique. A non-limitative example of suitable active set technique is given by [VOGLIS2004].

Spline Functions

According to a second strategy, the seismic horizon surface(s) may be modeled by using a combination of spline functions.

As is well known, spline functions are functions defined piecewise by polynomials. Usually, such spline functions are defined using a set of knots, also known as "knot vector," which defines the different pieces on which the polynomials are defined. Each spline function has limited support in that it is defined on some adjacent pieces only and is not defined on the other pieces (i.e., null on the other pieces). The resulting surface is obtained by combining the spline functions with coefficients.

The present disclosure may use any type of spline functions. In preferred embodiments, the spline functions are basis-splines (B-splines) or non-uniform rational B-splines (NURBS). However, other spline functions may also be considered in other embodiments, such as, e.g., box splines, simplex splines, polyhedral splines, cone splines, etc.

The spline functions are also defined by their degree. The choice of a specific degree for the spline functions corresponds to a specific embodiment of the present disclosure. Of course, the degree of the spline functions is preferably higher than or equal to 2. For instance, the degree of the spline functions may be chosen equal to 2 or equal to 3.

The knot vector(s) (for instance one knot vector if the seismic horizon surface is a 1D curve and two knot vectors if the seismic horizon surface is a 2D surface) and the order (degree) of the spline functions used for modeling the seismic horizon surface are preferably predefined. Preferably, the total number of knots used for modeling the seismic horizon surface is lower than the number $N_{ph}$ of seismic values in a horizontal plane of the seismic image. For instance, the total number of knots is preferably lower than $N_{ph}/10$ or even lower than $N_{ph}/100$. Alternatively, or in combination thereof, each knot vector may be an open uniform knot vector. Using a uniform knot vector reduces the computational complexity. In turn, using a non-uniform knot vector enables to model more complex shapes.

When using spine functions, initializing a seismic horizon surface (step S31) may resume to initializing the coefficients used for combining the spline functions. For instance, the seismic horizon surface may be initialized to a substantially flat horizontal surface.

The seismic horizon surface is then iteratively modified (step S32) by iteratively modifying the coefficients used for combining the spline functions. Hence, the coefficients are iteratively modified to progressively increase alignment between local orientations of the seismic horizon surface (formed by combining the spline functions using said coefficients) and the corresponding local seismic dips. In other words, the updated coefficients are computed based on the local seismic dips, to produce an updated seismic horizon surface with increased alignment between its local orientations and the local seismic dips.

We now provide a non-limitative example of how the processing method 30 may be implemented with spline functions. In this example, the spline functions are assumed in a non-limitative manner to be B-splines.

As discussed above, the (Poisson) equation to be solved is given by:

$$\Delta\tau = \text{div}(G)$$

First, the problem is reformulated in order to adapt it to the formalism of spline functions. Here, the problem is reformulated using the continuous Galerkin method, in order to switch from a finite volume method to a similar finite (discrete) element method, via weak/variational formulation with a test function v:

$$\int_\Omega v \Delta\tau = \int_\Omega v \nabla \cdot G$$

$$\Leftrightarrow -\int_\Omega \nabla v \cdot \nabla \tau + \int_{\partial\Omega} v(\nabla\tau \cdot \vec{n}) = -\int_\Omega \nabla v \cdot G + \int_{\partial\Omega} v(G \cdot \vec{n}) \quad (E18)$$

expression in which $\Omega$ is the bounded open set domain on which is defined div(G), and $\partial\Omega$ is the boundary of this domain.

For instance, we can consider as edge condition $\nabla\tau \cdot \vec{n} = 0$, or $\int_{\partial\Omega} v(\nabla\tau \cdot \vec{n}) = 0$, i.e., the standard Neumann conditions. Hence, we get:

$$-\int_\Omega \nabla v \cdot \nabla \tau = -\int_\Omega \nabla v \cdot G + \int_{\partial\Omega} v(G \cdot \vec{n}) \quad (E19)$$

If we use the Gauss-Newton algorithm, we apply the equation (E19) to $\tau^{(k+1)} = \tau^{(k)} + \delta\tau^{(k)}$:

$$-\int_\Omega \nabla v \cdot \nabla (\tau^{(k)} + \delta\tau^{(k)}) = -\int_\Omega \nabla v \cdot G^{(k)} + \int_{\partial\Omega} v(G^{(k)} \cdot \vec{n}) \quad (E20)$$

$$\Leftrightarrow -\int_\Omega \nabla v \cdot \nabla \delta\tau^{(k)} = -\int_\Omega \nabla v \cdot G^{(k)} + \int_\Omega \nabla v \cdot \nabla \tau^{(k)} + \int_{\partial\Omega} v(G^{(k)} \cdot \vec{n}) \quad (E21)$$

$$\Leftrightarrow -\int_\Omega \nabla v \cdot \nabla \delta\tau^{(k)} = \int_\Omega \nabla v \cdot r^{(k)} + \int_{\partial\Omega} v(G^{(k)} \cdot \vec{n}) \quad (E22)$$

wherein $r^{(k)} = \nabla\tau^{(k)} - G^{(k)}$.

We now rewrite these expressions by using the basis functions of the B-splines. In discrete variational formulation, the function v may be expressed as:

$$v = \sum_{i=1}^{N} V_i N_i$$

expression in which:
i is the index of the basis function;
N is the number of basis functions;
$N_i$ is the basis function (B-spline) of index i; and
$V_i$ is the coefficient associated to the basis function $N_i$.

Similarly, in discrete variational formulation, $\delta\tau^{(k)}$ and $\tau^{(k)}$ may be expressed with the basis functions of the B-splines as follows:

$$\delta\tau^{(k)} = \sum_{j=1}^{N} \alpha_j N_j \quad (E23)$$

$$\tau^{(k)} = \sum_{j=1}^{N} \beta_j N_j \quad (E24)$$

Accordingly, by choosing $v = N_i$ as test functions, the expression (E21) may be rewritten as follows:

$$-\int_\Omega \sum_{j=1}^{N} \alpha_j \nabla N_j \cdot \nabla N_i = \quad (E25)$$

$$-\int_\Omega \nabla N_i \cdot G^{(k)} + \int_\Omega \sum_{j=1}^{N} \beta_j \nabla N_j \cdot \nabla N_i + \int_{\partial\Omega} \sum_{i=1}^{N} (G^{(k)} \cdot \vec{n}) N_i \Rightarrow$$

$$\underbrace{-\sum_{j=1}^{N} \int_\Omega \alpha_j \nabla N_j \cdot \nabla N_i}_{K\alpha} =$$

-continued $$-\underbrace{\int_\Omega \nabla N_i \cdot G^{(k)}}_{X} + \underbrace{\sum_{j=1}^{N} \int_\Omega \beta_j \nabla N_j \cdot \nabla N_i}_{K\beta} + \sum_{i=1}^{N} \int_{\partial\Omega} (G^{(k)} \cdot \vec{n}) N_i \Leftrightarrow$$

$$K\alpha - X + K\beta + \sum_{i=1}^{N} \int_{\partial\Omega} (G^{(k)} \cdot \vec{n}) N_i =$$

$$0 \Leftrightarrow K\alpha = X - K\beta - \sum_{i=1}^{N} \int_{\partial\Omega} (G^{(k)} \cdot \vec{n}) N_i$$

expressions in which:
K denotes the rigidity matrix (a.k.a. stiffness matrix); and
X is a vector $\int_\Omega \nabla N_i \cdot G^{(k)}$ the values of which may be computed at each basis function $N_i$, $X = [X_1 \ldots X_N]^T$.

In matrix notation, since $\tau^{(k+1)} = \tau^{(k)} + \delta\tau^{(k)}$ according to the Gauss-Newton algorithm, then updating r may resume, according to the expressions of $\tau^{(k)}$ and $\delta\tau^{(k)}$ using the basis functions of the B-splines, to computing:

$$\beta^{(k+1)} = \beta^{(k)} + \alpha^{(k)}$$

The equation (E25) is Poisson's equation reformulated by using the continuous Galerkin method. Hence, following the continuous Galerkin method, a good discrete approximate solution of Poisson's equation, which is given by $\alpha^{(k)}$, may be computed by inverting the equation (E25).

In equation (E25), we need to determine the following edge term:

$$\Sigma_{i=1}^{N} \int_{\partial\Omega} (G^{(k)} \cdot \vec{n}) N_i \tag{E26}$$

This edge term is equal to zero only when the basis function $N_i$ is equal to zero on the edge $\partial\Omega$ of the seismic horizon surface. When the seismic horizon surface is a 2D surface (instead of a 1D curve), then the basis function $N_i$ may be expressed as $N_i(x, y) = B_i(x)B_j(y)$ wherein $N_i$ is the basis function of the 2D B-splines, $B_i$ and $B_j$ are the basis functions of the 1D B-splines, $1 \leq i,j \leq N$. Hence, the edge term is null when at least one among $B_i$ and $B_j$ is null on the edge $\partial\Omega$ of the seismic horizon surface.

Similarly, $G_x^{(k)} = B'_i(x)B_j(y)$ and $G_y^{(k)} = B_i(x)B'_j(y)$, wherein $B'_i(x)$ and $B'_j(y)$ are the derivative functions of respectively $B_i(x)$ and $B_j(y)$, the basis functions of the 1D B-splines.

Figure 7:
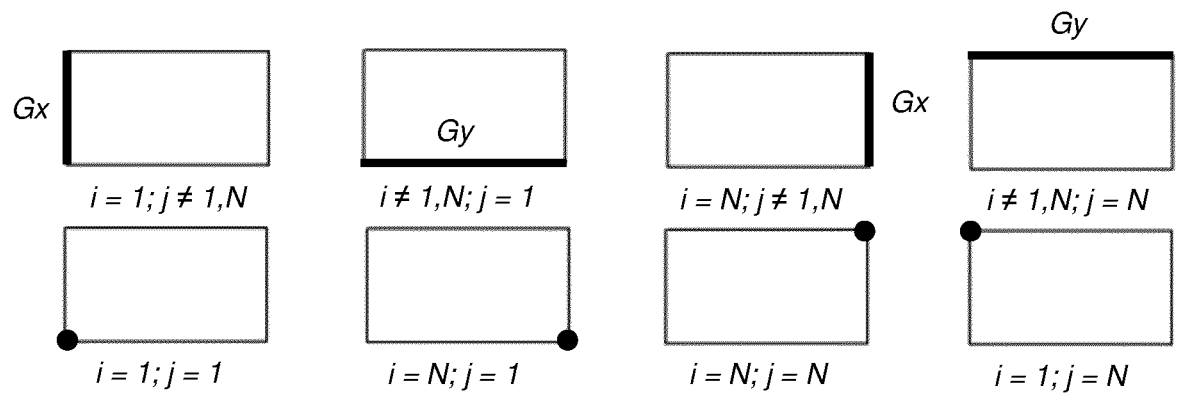
FIG. 7 provides charts illustrating specific cases for an edge term encountered when modeling a seismic horizon surface with spline functions.

Hence, this leads to eight possible cases of specific values for $(G^{(k)} \cdot \vec{n})$ when the basis function $N_i$ is not null. Indeed, the basis functions of B-splines are all 0 on the edge, except the first and last one which are equal to 1 on the edge. These eight possible cases are illustrated by FIG. 7. Hence, the edge term may be computed, such that the equation (E25) is indeed defined and may be inverted to compute $\alpha^{(k)}$.

Hence, by using the above equations, the seismic horizon surface may be modeled by spline functions and iteratively modified to progressively increase alignment between local orientations and local seismic dips.

As discussed above in reference to FIG. 5, the seismic horizon surface may be constrained by a set of setpoints when progressively increasing alignment between local orientations and corresponding local seismic dips.

In the case of a seismic horizon surface modeled by spline functions, the set of setpoints is, in preferred embodiments, approximated by using spline quasi-interpolant operators.

Indeed, while spline functions are an efficient tool to describe complex surfaces, they are difficult to use as such when it is required that the surface intersects specific (set) points. Spline quasi-interpolant operators [SABLON2007] may be used to closely approximate target functions by using spline functions.

We choose a local interpolation method (quasi-interpolant operator) because the seismic horizon surfaces are usually constrained at most locally, such that we aim at constraining the coefficients of only some of the spline functions while letting free the coefficients of the other spline functions. The goal is then to constraint some coefficients by interpolating a given function in a portion of the seismic horizon surface, while letting the others free, where the seismic horizon surface is not constrained by setpoints.

For instance, assuming B-splines and given a function $f$, the spline quasi-interpolant operator Q is such that:

$$Qf(x) = \Sigma_{k=1}^{N} \mu_k(f) B_k(x) \approx f(x) \tag{E27}$$

wherein:
$B_k(x)$ corresponds to the basis function of index k of the B-splines; and
$\mu_k(f)$ is a function that depends only the values of $f$ which are located around the support of $B_k(x)$.

It is known that the spline quasi-interpolant operator Q can match exactly the function $f$ if said function $f$ is a polynomial function, provided that the degree of said polynomial function is equal to or lower than the degree of the basis functions of the B-splines considered.

In the present case, the function $f$ to be approximated may correspond to a monomial ($f = x^n$) as we want to estimate seismic horizon surfaces for which we can make the assumption that they can always be approximated by polynomial functions of high enough degrees. The set of setpoints obtained at step S34 corresponds to known values of the function $f$, i.e., points that need to be interpolated by the seismic horizon surface. It should be noted that the choice of the function $f$ is not limited to monomials. For instance, instead of approximating monomials, we can approximate Legendre polynomials, as they are better conditioned than monomials, etc.

Different types of spline quasi-interpolant operators exist. These different types comprise mainly integral, differential and discrete spline quasi-interpolant operators. While the present disclosure is not limited to a specific type of spline quasi-interpolant operator, integral spline quasi-interpolant operators are particularly well adapted to the case where the set of setpoints consists in collocated discrete points, as will be usually the case with, e.g., points positioned manually by a human interpreter. In the sequel, we consider in a non-limitative manner the case of an integral spline quasi-interpolant operator.

We define the following operator:

$$\langle f, g \rangle = \int_\mathbb{R} f(x) g(x) dx \tag{E28}$$

Accordingly, the integral spline quasi-interpolant operator Q is given by:

$$\overline{Q} f = \Sigma_{k=1}^{N} \langle f, \overline{B}_k \rangle B_k = \Sigma_{k=1}^{N} \left( \int_\mathbb{R} f \overline{B}_k \right) B_k \tag{E29}$$

expression in which:
$\overline{B}_k$ is a linear combination of the basis functions $B_k$:

$$\overline{B}_k = \Sigma_i \gamma_i^{(k)} B_i \tag{E30}$$

$\langle f, \overline{B}_k \rangle$ i.e. $\int_\mathbb{R} f \vec{B}_k$ are the $\alpha_k$ coefficients of the B-splines that we want to compute, in equation (E23).

We then have, for each basis function of index k:

$$\langle x^n, \overline{B}_k \rangle = \sum_i \gamma_i^{(k)} \langle x^n, B_i \rangle$$

Hence, for each basis function of index k, the following linear system needs to be solved:

$$\sum_i \gamma_i^{(k)} \langle x^n, B_i \rangle = \alpha_{k,n}$$

wherein:
- $\langle x^n, B_i \rangle$ is the moment of the monomial $x^n$ on the basis function of index i which may be calculated, for instance, by using a function known as the (Carlson) R-function which computes the Dirichlet average of the monomial $x^n$;
- $\alpha_{k,n}$ is the coefficient associated to the basis function $B_k$ in order that the sum equals $x^n$; and
- the exact solution of this equation is known for, e.g., $f=x^n$, for instance by using Marsden's Identity [MARSDEN1970].

We aim at computing all monomials from degree 0 to p so the equality is enforced for all n from 0 to p (p being the order of the B-splines). Hence, for each index k, we have (p+1) equations to solve. Finally, we can solve the linear system and find the coefficients $\gamma_i^{(k)}$ of $\overline{B}_k$ for one basis function of index k. We then can repeat the process for all indexes k, allowing to find the $\overline{B}_k$ for every basis function of the B-splines.

In practice, each $\overline{B}_k$ depends only on $B_k$ and on some of its neighbors ($B_{k-1}$, $B_{k+1}$, etc.), i.e., it does not depend on all the N basis functions of the B-splines. In order to be able to solve the linear system, the range of the index i must be well defined. If the order p is even, it is possible to consider the p/2 basis functions before the basis function of index k and the p/2 after, for a total of (p+1) basis functions altogether. Otherwise, if p is odd, it is possible to consider the (p+1)/2 basis functions before the basis function of index k and the (p+1)/2 basis functions after, for a total of (p+2) basis functions altogether. In the latter case, the linear system is underdetermined, and it is possible to apply, for instance, a least-square method minimizing the l2 norm of the solution of the linear system.

Hence, the values of the coefficients $\gamma_i^{(k)}$ (and of the corresponding $\vec{B}_k$) and the values of the coefficients $\mu_k(f) = \langle f, \overline{B}_k \rangle$ may be computed for every index k ($1 \leq k \leq N$) by using methods known to the skilled person.

For a 2D seismic horizon surface, then the equation (E30) becomes:

$$\vec{B}_{k_1,k_2} = \Sigma_i \Sigma_j \gamma_{i,j}^{(k_1,k_2)} B_{i,j} \quad (E31)$$

wherein $1 \leq k_1, k_2 \leq N$. As discussed previously, each $\vec{B}_{k_1,k_2}$ typically does not need to depend on all $B_{i,j}$ basis functions, and it is possible to consider only ($p_1$+1) or ($p_1$+2) basis functions along the horizontal dimension x ($p_1$ being the order of the B-splines along the horizontal dimension x) and ($p_2$+1) or ($p_2$+2) basis functions along the horizontal dimension y ($p_2$ being the order of the B-splines along the horizontal dimension y).

In some embodiments, it is possible to simplify equation (E31) as:

$$\vec{B}_{k_1,k_2}(x,y)(\vec{B}_{k_1}(x)\vec{B}_{k_2}(y)) \quad (E32)$$

In practice, this simplification has proven to approximate correctly typical sets of setpoints that may be encountered for seismic images.

Hence, the coefficients $\mu_k(f)$ may be calculated for each basis function of the B-splines. Usually the set of setpoints will consist in collocated points, i.e., the function $f$ will be defined only in a portion of the full domain covered by the basis functions of the B-splines. Since each basis function of the B-splines has limited support, i.e., it is not defined on all the pieces defined by the knot vector(s), then not all basis functions influence the seismic horizon surface in the area of each setpoint of the set of setpoints.

Figure 8:
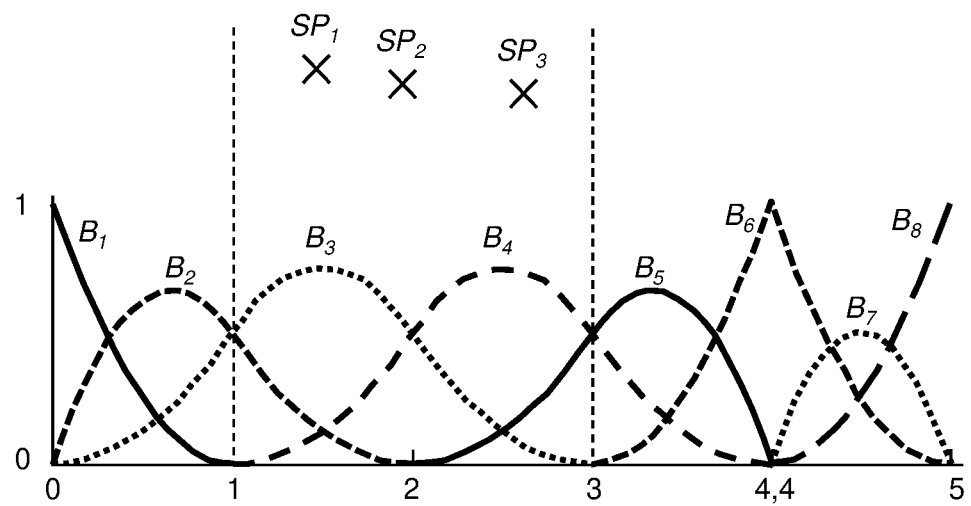
FIG. 8 is a chart showing examples of B-spline basis functions together with a set of setpoints.

FIG. 8 represents exemplary basis functions of B-splines, in the case where the B-splines are of order 2 and where the knot vector corresponds to the non-uniform open knot vector {0,0,0,1,2,3,4,4,5,5,5}. As can be seen in FIG. 8, there are 8 basis functions $B_k$, i.e., N=8. Each of these basis functions has limited support, e.g., $B_1$ is defined only between the knots 0 and 1, $B_2$ is defined only between the knots 0 and 2, $B_2$ is defined only between the knots 0 and 3, $B_4$ is defined only between the knots 1 and 4, etc.

FIG. 8 shows also three setpoints $SP_1$, $SP_2$ and $SP_3$. As can be seen in FIG. 8, the setpoints $SP_1$, $SP_2$ and $SP_3$ are located between the knots 1 and 3, in a portion of seismic horizon surface mainly influenced by the basis functions $B_3$ and $B_4$, and, to a lesser extent, by the basis functions $B_2$ and $B_5$.

Hence, as can be seen in FIG. 8, it is possible to constrain only the coefficients $\alpha_3$ and $\alpha_4$, and, possibly, $\alpha_2$ and $\alpha_5$. Hence, only these coefficients need to be set to the coefficients obtained with the spline quasi-interpolant operator, i.e., $\mu_3(f)$ and $\mu_4(f)$, and, possibly, $\mu_2(f)$ and $\mu_5(f)$. The other coefficients (in this example: $\alpha_1$, $\alpha_6$, $\alpha_7$ and $\alpha_8$, and, possibly, $\alpha_2$ and $\alpha_5$ if they are not set to $\mu_2(f)$ and $\mu_5(f)$) are not constrained and may be iteratively modified, during step S32, to increase alignment between local orientations of the seismic surface and corresponding local seismic dips, in the portion of the seismic horizon surface that is not constrained by the set of setpoints.

Hence, in preferred embodiments, approximating the set of setpoints using a spline quasi-interpolant operator comprises selecting a subset of the spline functions which correspond to the spline functions that actually influence the seismic horizon surface in the portion for which a set of setpoints has been obtained. Accordingly, said selection may be carried out based on the positions of the setpoints with respect to a set of knots of the spline functions (i.e., with respect to the respective supports of the spline functions) and/or with respect to the positions of peak values of the spline functions, etc. For instance, each spline function having at least one setpoint in its support may be selected. According to another example, it is possible to select spline functions which have peak values in the vicinity of at least one setpoint (which correspond to the spline functions which will influence the most the seismic horizon surface in the portion comprising setpoints), etc.

Then, the spline quasi-interpolant operator is used to constrain only the coefficients associated with the selected subset of spline functions. The other coefficients of the other spline functions are not constrained and may be iteratively modified to increase alignment between local orientations and corresponding local seismic dips.

As discussed above, the seismic horizon surface is iteratively modified by inverting the equation (E25):

$$K\alpha = X - K\beta - \underbrace{\sum_{i=1}^{N} \int_{\partial\Omega} (G^{(k)} \cdot \vec{n}) N_i}_{D}$$

which yields a linear system $K\alpha=D$. $\alpha$ contains the coefficients $\alpha_k$. As discussed above in reference to equation (E16) the matrices K, $\alpha$ and D may be decomposed into constrained parts and unconstrained parts, as follows:

$$\underbrace{\begin{pmatrix} K_{ff} & K_{fc} \\ K_{cf} & K_{cc} \end{pmatrix}}_{K} \underbrace{\begin{pmatrix} \alpha_f \\ \alpha_c \end{pmatrix}}_{\alpha} = \underbrace{\begin{pmatrix} D_f \\ D_c \end{pmatrix}}_{B} \quad (E33)$$

expression in which $\alpha_c$ corresponds to the values of $\alpha$ that are constrained by the set of setpoints, $\alpha_f$ corresponds to the values of $\alpha$ that can be freely modified from one iteration to another. More specifically, $\alpha_c$ contains the differences between, on one hand, a vector containing the current values $\alpha_k$ for the selected subset of spline functions (those that influence the seismic horizon surface in the vicinity of the setpoints) and, on the other hand, a vector containing the coefficients $\mu_k(f)$ given by the quasi-interpolant operator for said selected subset of spline functions. $\alpha_f$ comprises the coefficients that can be modified, associated to the remaining spline functions (those that have little or no influence in the vicinity of the setpoints). An expression similar to equation (E17) may be used to compute $\alpha_f$.

It should be noted that the selected subset of spline functions remains unchanged from one iteration to another of step S32. Also, the coefficients $\mu_k(f)$ associated to the selected subset of spline functions may remain unchanged from one iteration to another of step S32. The coefficients $\mu_k(f)$ computed can be used to initialize the seismic horizon surface, during step S31.

It should be noted that it is also possible to consider a set of setpoints that defines inequalities that need to be locally satisfied by the seismic horizon surface. In other words, each setpoint may be defined as a continuous interval of allowed positions (i.e., maximum and minimum values along the vertical dimension) for the corresponding point of the seismic horizon surface (i.e., the point having the same coordinates in the horizontal dimension(s) as the considered setpoint). Considering a set of constraints defining inequalities is useful, e.g., in the presence of faults in the geological formation. For instance, a simple implementation may consist in ensuring that the inequalities are satisfied when initializing the seismic horizon surface, and when modifying the seismic horizon surface during step S32. Alternatively, constraining the seismic horizon surface to approximate setpoints defined by inequalities may use an active set technique. A non-limitative example of suitable active set technique is given by [VOGLIS2004].

It is emphasized that the present disclosure is not limited to the above exemplary embodiments. Variants of the above exemplary embodiments are also within the scope of the present disclosure.

For instance, the present disclosure has mainly assumed, when considering spline functions, the case of a spline quasi-interpolant operator for approximating a set of setpoints. However, other methods, preferably local interpolation methods, may be considered in order to approximate a set of setpoints when using spline functions to model the seismic horizon surface.

The above description clearly illustrates that by its various features and their respective advantages, the present disclosure reaches the goals set for it, by using a triangle mesh or spline functions that can describe complex surfaces with a limited number of variables, and that enable also to constrain the seismic horizon surface to approximate a set of setpoints.

Figure 9:
FIG. 9 provides examples of seismic horizon surfaces according to parts a) and b) obtained when using a triangle mesh and spline functions.
Figure 9:
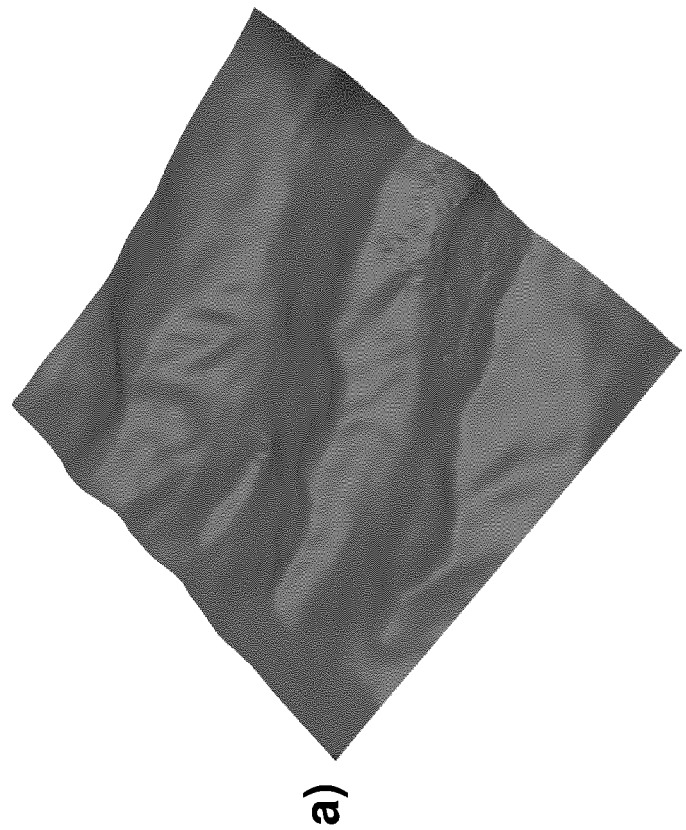

FIG. 9 shows examples of seismic horizon surfaces obtained from a same seismic image when using a triangle mesh (part a) of FIG. 9) and when using spline functions (part b) of FIG. 9, which uses B-splines). As can be seen, for similar computing time and accuracy, the topography is much more detailed in the version using spline functions (part b) FIG. 9) than in the triangle mesh version (part a) FIG. 9). Hence, the spline functions are better suited to describe complex shapes than the triangle meshes. Both these obtained seismic horizon surfaces have similar shapes and are consistent with the observations made by human interpreters on the same seismic image.

The various embodiments described above can be combined to provide further embodiments. All of the non-patent publications referred to in this specification are incorporated herein by reference, in their entirety. Aspects of the embodiments can be modified, if necessary to employ concepts of the various publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

REFERENCES

[LOMASK2006] Lomask, et al.: "Flattening without picking" Geophysics Volume 71 Issue 4 (July-August 2006), Pages 13-20.

[SABLON2007] Sablonnière: "Quasi-interpolants splines: exemples et applications", ESAIM: Proceedings, Volume 20 (2007), Pages 195-207.

[VOGLIS2004] Voglis, Lagaris: "BOXCQP: An algorithm for bound constrained convex quadratic problems", Proceedings of the 1st International Conference: From Scientific Computing to Computational Engineering, IC-SCCE, Athens, Greece (2004).

[MARSDEN1970] Marsden: "An identity for spline functions with applications to variation-diminishing spline approximation", Journal of Approximation Theory, Volume 3 Issue 1 (March 1970), Pages 7-49.

The invention claimed is:

1. A computer-implemented processing method for processing a seismic image comprising seismic values obtained from seismic measurements performed on a geological formation, the processing method comprising:
   determining a seismic dip image based on the seismic image, said seismic dip image comprising local seismic dips representative of a local gradient of the seismic values of the seismic image;
   initializing a seismic horizon surface modeled using a combination of spline functions, wherein the spline functions are basis-splines (B-splines);
   obtaining a set of setpoints of the seismic image; and
   iteratively modifying coefficients used for combining the spline functions, thereby iteratively modifying the seismic horizon surface, to progressively increase alignment between local orientations of the seismic horizon surface and the corresponding local seismic dips, while constraining the seismic horizon surface to approximate the set of setpoints using a spline quasi-interpolant operator, until a predetermined stop criterion is satisfied, wherein approximating the set of setpoints using the spline quasi-interpolant operator comprises selecting a subset of spline functions among the spline functions used for modeling the seismic horizon surface, wherein the spline quasi-interpolant operator is used to determine the coefficients associated to the subset of spline functions.

2. The processing method according to claim 1, wherein the spline functions are non-uniform rational B-splines-(NURBS).

3. The processing method according to claim 1, wherein the spline functions are defined by a set of knots comprising a number of knots that is lower than a number of seismic values in a horizontal plane of the seismic image.

4. The processing method according to claim 1, wherein the spline functions are of degree 2 or 3.

5. The processing method according to claim 1, wherein the selecting is carried out by comparing the positions of the setpoints with the positions of a set of knots of the spline functions and/or with the positions of peak values of the spline functions.

6. The processing method according to claim 1, wherein the spline quasi-interpolant operator is an integral spline quasi-interpolant operator.

7. The processing method according to claim 1, wherein obtaining the set of setpoints comprises obtaining a seed on a seismic trace of the seismic image and propagating laterally the seed by searching for points of adjacent seismic traces that satisfy a predetermined criterion of similarity with the seed.

8. The processing method according to claim 1, wherein constraining the seismic horizon surface to approximate the set of setpoints uses an active set technique.

9. A non-transitory computer-readable storage medium comprising instructions which, when executed by at least one processor, configure said at least one processor to carry out the processing method according to claim 1.

10. A computer system for processing a seismic image, said computer system comprising at least one processor configured to carry out the processing method according to claim 1.

11. A computer-implemented processing method for processing a seismic image comprising seismic values obtained from seismic measurements performed on a geological formation, the processing method comprising:

determining a seismic dip image based on the seismic image, said seismic dip image comprising local seismic dips representative of the local gradient of the seismic values of the seismic image;

initializing a seismic horizon surface modeled using a combination of spline functions;

obtaining a set of setpoints of the seismic image; and iteratively modifying coefficients used for combining the spline functions, thereby iteratively modifying the seismic horizon surface, to progressively increase alignment between local orientations of the seismic horizon surface and the corresponding local seismic dips while constraining the seismic horizon surface to approximate the set of setpoints using a spline quasi-interpolant operator, until a predetermined stop criterion is satisfied, wherein approximating the set of setpoints using a spline quasi-interpolant operator comprises selecting a subset of spline functions among the spline functions used for modeling the seismic horizon surface, wherein the spline quasi-interpolant operator is used to determine the coefficients associated to the subset of spline functions.

12. The processing method according to claim 11, wherein the spline functions are basis-splines (B-splines) or non-uniform rational basis-splines (NURBS) or simplex splines or box splines or polyhedral splines or cone splines.

13. The processing method according to claim 11, wherein the selecting is carried out by comparing the positions of the setpoints with the positions of a set of knots of the spline functions and/or with the positions of peak values of the spline functions.

14. The processing method according to claim 11, wherein the spline quasi-interpolant operator is an integral spline quasi-interpolant operator.

15. The processing method according to claim 11, wherein obtaining the set of setpoints comprises obtaining a seed on a seismic trace of the seismic image and propagating laterally the seed by searching for points of adjacent seismic traces that satisfy a predetermined criterion of similarity with the seed.

16. A non-transitory computer-readable storage medium comprising instructions which, when executed by at least one processor, configure said at least one processor to carry out the processing method according to claim 11.

17. A computer system for processing a seismic image, said computer system comprising at least one processor configured to carry out the processing method according to claim 11.

* * * * *